(12) United States Patent
Fleury et al.

(10) Patent No.: US 10,050,439 B2
(45) Date of Patent: Aug. 14, 2018

(54) DEVICE FOR THE ELECTRIC POWER SUPPLY OF A LOAD AND ASSOCIATED METHOD

(71) Applicants: AIRBUS GROUP SAS, Blagnac (FR); AIRBUS DEFENCE AND SPACE SAS, Les Mureaux (FR)

(72) Inventors: Benoit Fleury, Suresnes (FR); Gregor Massiot, Toulouse (FR); Pierre-Bertrand Lancelevee, Aix-en-Provence (FR); Julien Labbe, Levallois-Perret (FR)

(73) Assignees: AIRBUS GROUP SAS, Blagnac (FR); AIRBUS DEFENCE AND SPACE SAS, Les Mureaux (FR)

( * ) Notice: Subject to any disclaimer, the term of this patent is extended or adjusted under 35 U.S.C. 154(b) by 136 days.

(21) Appl. No.: 15/025,317

(22) PCT Filed: Sep. 30, 2014

(86) PCT No.: PCT/EP2014/070869
§ 371 (c)(1),
(2) Date: Mar. 28, 2016

(87) PCT Pub. No.: WO2015/044438
PCT Pub. Date: Apr. 2, 2015

(65) Prior Publication Data
US 2016/0233672 A1    Aug. 11, 2016

(30) Foreign Application Priority Data
Sep. 30, 2013  (FR) ...................... 13 59454

(51) Int. Cl.
*H02J 1/00*      (2006.01)
*H02J 3/00*      (2006.01)
(Continued)

(52) U.S. Cl.
CPC .............. *H02J 1/00* (2013.01); *H02J 7/0063* (2013.01); *H02J 7/0068* (2013.01); *H02J 7/345* (2013.01); *H02J 2007/0067* (2013.01)

(58) Field of Classification Search
CPC ............. H02J 1/10; H02J 7/0063; H02J 7/345
(Continued)

(56) References Cited

U.S. PATENT DOCUMENTS 6,204,633 B1    3/2001  Kitagawa
2005/0151513 A1  7/2005  Cook et al.
(Continued)

FOREIGN PATENT DOCUMENTS

EP    2 360 806 A2    8/2011

OTHER PUBLICATIONS

International Search Report, dated Nov. 10, 2014, from corresponding PCT application.

*Primary Examiner* — Lincoln Donovan
*Assistant Examiner* — Metasebia Retebo
(74) *Attorney, Agent, or Firm* — Young & Thompson

(57) ABSTRACT

A device (10) for the electric power supply of a load (11), includes at least two energy storage elements (13, 14), elements for determining the power needs of the load (11), elements (16, 17) for monitoring each energy storage element (13, 14), which are able to provide information about a maximum instantaneous power of each energy storage element (13, 14), a calculation body (19) for determining a maximum secured power according to the electromotive force (Ebat(t)) and the resistance (Rbat(t)) of the Thévenin model, a maximum specified current and a maximum specified voltage, and elements (Cbat(t), Csc(t)) for controlling each energy storage element (13, 14), the elements being
(Continued)

adjusted over time according to the power needs of the load (11) and the maximum secured power of each energy storage element (13, 14).

15 Claims, 2 Drawing Sheets

(51) Int. Cl.
*H02J 7/00* (2006.01)
*H02J 7/34* (2006.01)

(58) Field of Classification Search
USPC .................................................... 307/80–82
See application file for complete search history.

(56) References Cited

U.S. PATENT DOCUMENTS

| | | | | |
|---|---|---|---|---|
| 2010/0026092 A1* | 2/2010 | Iida | ................... | H01M 10/44 |
| | | | | 307/18 |
| 2010/0026244 A1* | 2/2010 | Iida | ................... | B66B 5/027 |
| | | | | 320/134 |
| 2012/0319653 A1 | 12/2012 | Kumar et al. | | |

* cited by examiner and optimization of the utilization of energy storage sources by proposing, according to a first aspect, a device for the electric power supply of a load.

DEVICE FOR THE ELECTRIC POWER SUPPLY OF A LOAD AND ASSOCIATED METHOD

DOMAIN OF THE INVENTION

This invention relates to a device for the electric power supply of a load. The invention also relates to the associated method. The invention relates more particularly to electric power supply devices comprising several energy storage sources also known as "hybrid power supplies".

By "hybrid power supply" one understands a power supply comprising several energy storage sources such as a battery associated with a pack of supercapacitors or even a battery associated with a fuel cell.

The invention finds applications in many domains and can be utilized in aircraft, satellites or even space vehicles.

STATE OF THE ART

Several known devices exist that utilize several energy storage sources which power a load. These devices are particularly present in electric busses, tramways or electric or hybrid motor vehicles. These devices implement complementary energy storage sources, such as a battery and a pack of supercapacitors. The prior art knows in particular Patent No. FR 2 947 006 describing this type of device.

In general, the implementation of the complementarity of sources is achieved by simply placing energy storage technologies in parallel or in series. However, this technical solution does not allow the efficient utilization of the energy storage sources. The power needs of the load vary over time. One of the aims of this invention is to share these power needs among the different energy storage sources.

Furthermore, the utilization of a hybrid power supply within the framework of an aircraft or space vehicle imposes an additional problem with regard to the prevention of ageing of the energy storage sources. In fact, ageing of the energy storage sources must be controlled so as to respect the life specification of the system, typically of the order of ten years.

The prior art knows the scientific publication entitled "An Energy Management System for a Battery Ultracapacitor Hybrid Electric Vehicle", published at the time of the "Fourth International Conference on Industrial and Information Systems, ICIIS 2009, 28-31 Dec. 2009, Sri Lanka", and the scientific publication entitled "Optimizing for Efficiency or Battery Life in a Battery/Supercapacitor Electric Vehicle", published in the journal "IEEE TRANSACTIONS ON VEHICULAR TECHNOLOGY, VOL. 61, NO. 4, MAY 2012". These documents describe control and command laws in which a maximum secured power of each energy storage element is fixed in a static manner and does not take account of variations of the internal state and of the state of degradation of the storage element.

DESCRIPTION OF THE INVENTION

This invention aims to respond to the problems of ageing and optimization of the utilization of energy storage sources by proposing, according to a first aspect, a device for the electric power supply of a load.

To that effect, this invention relates to a device comprising at least two energy storage elements connected to said load, said energy storage elements comprising a maximum specified discharge current and a minimum specified voltage guaranteeing a life of said energy storage elements, means for determining the power needs of said load, means for controlling each energy storage element which are able to define a power delivered by said energy storage element, and means for monitoring each energy storage element which are able to provide information about a maximum instantaneous power that can be requested of said energy storage element, said monitoring means being able to provide information about an electromotive force and a resistance of the Thévenin equivalent model of each energy storage element reflecting the internal state and the state of health of each energy storage element, the device comprising a calculation body able to determine, for each energy storage element, a maximum secured power according to the electromotive force and to the resistance, according to the maximum specified current and to the minimum specified voltage, and said control means being adjusted over the time according to the power needs of said load and to the maximum secured power of each energy storage element.

The invention therefore enables over-exploitation of the energy storage elements to be limited over time by limiting their utilization to the ranges of current and voltage parameters specified by the manufacturer. These parameter ranges guarantee a life of the energy storage elements, typically of the order of ten years. The invention therefore reduces damage to said energy storage elements over time.

According to one embodiment, since said energy storage elements comprise a maximum specified recharging current and a maximum specified recharging voltage guaranteeing a life of said energy storage elements, the calculation body is able to determine, for each energy storage element, the maximum secured recharging power according to the electromotive force and to the resistance reflecting the internal state and the state of health of each energy storage element, according to the maximum specified recharging current and to the maximum specified recharging voltage, said control means being adjusted over time according to the power needs of said load, to the maximum secured power and to the maximum secured recharging power of each energy storage element. This embodiment allows, for example, a first energy storage element to be utilized to recharge a second energy storage element when the power needs of the load are lower than the maximum secured power of the first energy storage element.

According to one embodiment, at least one energy storage element is a battery, a set of supercapacitors or a fuel cell. This embodiment allows a first energy storage element to be assembled with a rapid charging and discharging speed, such as a set of supercapacitors, with a second energy storage element whose charging and discharging speed is lower, such as a battery.

According to one embodiment, the electromotive force of the Thévenin equivalent model of each energy storage element is determined by a law of behavior expressed according to the utilization of the energy storage element. This embodiment allows the internal state and the state of health of each energy storage element to be known according to the time.

According to one embodiment, the monitoring means are able to provide information about an internal state of each energy storage element, the calculation body being able to determine an electromotive force and a resistance of the Thévenin equivalent model of each energy storage element according to the internal state of each energy storage element, said control means being adjusted over time according to the electromotive force and to the resistance. This embodiment allows the inclusion of the internal fluctuations of each energy storage element. For example, this embodiment allows the inclusion of the temperature fluctuations of an energy storage element and limits the utilization of an energy storage element to a range of temperature values guaranteeing its life.

According to one embodiment, the electromotive force and the resistance are variable over time. This embodiment allows a precise estimation of the electromotive force and of the resistance of the Thévenin equivalent model.

According to one embodiment, said maximum secured power is determined by the following equation:

$$Pbat.\max.spec(t) = \min\left[\frac{E^2bat(t)}{4Rbat(t)}, \frac{(Ebat(t) - Vbat.\min)Vbat.\min}{Rbat(t)}, Ebat(t)Ibat.\max - Rbat(t)I^2bat.\max\right].$$

According to one embodiment, said maximum secured recharging power is determined by the following equation:

$$Pbat.\max.rech.spec(t) = \max\left[-\frac{(Vbat.\max - Ebat(t))Vbat.\max}{Rbat(t)}, Ebat(t)Ibat.rech.\max - Rbat(t)I^2bat.rech.\max\right].$$

According to a second aspect, the invention relates to a method for controlling and commanding an electric power supply device comprising the following steps: determining over time said maximum secured power of the first energy storage element, comparing the power needs of the load with the maximum secured power of the first energy storage element, and adjusting the control means, in order to utilize the second energy storage element when the power needs of the load are greater than the maximum secured power of the first energy storage element. This embodiment allows the first energy storage element to be preserved and the utilization of the second energy storage element to be reduced.

According to one embodiment, the method comprises the following steps: determining an available power according to the time when the power needs of the load are lower than the maximum secured power of the first energy storage element, comparing the available power of the first energy storage element with a maximum secured recharging power of the second energy storage element, and adjusting the control means, in order to recharge the second energy storage element with the available power of the first energy storage element. This embodiment allows the second energy storage element to be utilized as a back-up source when the demand of the load is high. This back-up source is subsequently recharged by the main source when the needs of the load are lower than the production capacity of the main source guaranteeing its life.

BRIEF DESCRIPTION OF THE DRAWINGS

The invention will be better understood with the description, given below on purely explanatory terms, of the embodiments of the invention, with reference to the figures, in which.

DETAILED DESCRIPTION OF THE EMBODIMENTS OF THE INVENTION

Figure 1:
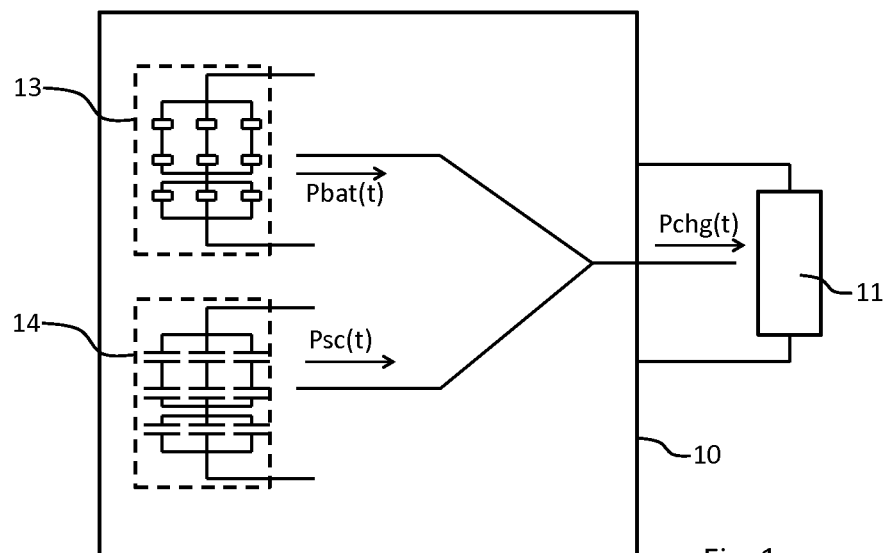
FIG. 1 illustrates a schematic representation of the powers of a device for the electric power supply of a load according to an embodiment of the invention.

FIG. 1 illustrates a device 10 for the electric power supply of a load 11. The power needs Pchg(t) of the load 11 are fulfilled over time by two energy storage elements 13, 14. In this embodiment, the first energy storage element 13 corresponds to a set of batteries delivering a power Pbat(t) and the second energy storage element 14 corresponds to a set of supercapacitors delivering a power Psc(t). As a variant, these energy storage elements can vary without changing the invention. The load 11 corresponds to a given actuator such as a servo-actuator.

Figure 2:
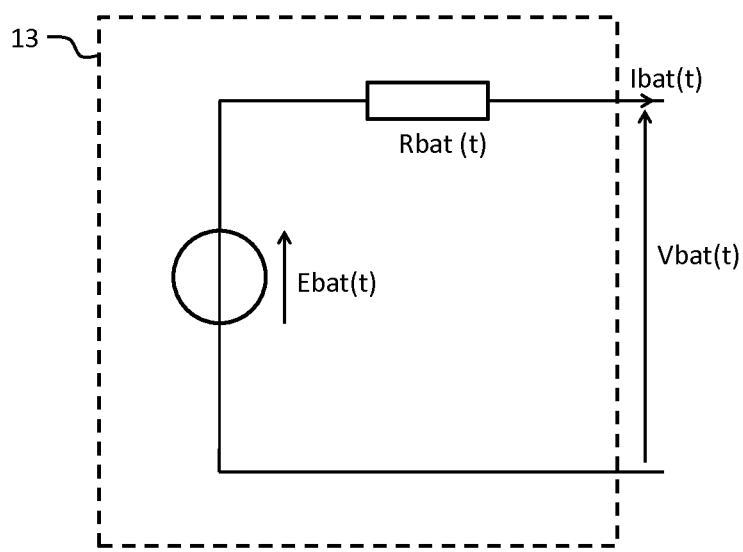
FIG. 2 illustrates a schematic representation of the Thévenin equivalent model of the first energy storage element of FIG. 1.

Each energy storage element 13, 14 is modeled by a Thévenin equivalent model. This model is shown in FIG. 2 for the first storage element 13. The equivalent model comprises a voltage source Ebat(t) in series with a resistor Rbat(t). The voltage source Ebat(t) represents the electromotive force of the source at the time t estimated on the basis of a law of degradation of the source and of the internal state of the source. The resistor Rbat(t) is also estimated according to the internal state of the source. This equivalent model allows the source discharge current Ibat(t) and the voltage Vbat(t) to be modeled at the source terminals at the time t.

These components Ebat(t) and Rbat(t) of the Thévenin equivalent model allow the maximum instantaneous power Pbat.max(t) that can be requested of the source to be calculated according to the equation:

$$Pbat.\max(t) = \frac{E^2bat(t)}{4Rbat(t)}.$$

Furthermore, each energy storage element 13, 14 is embodied to function in particular conditions guaranteeing its life. The discharge conditions of utilization are defined by a maximum specified discharge current Ibat.max, a minimum specified admissible voltage Vbat.min or even a specified operating temperature range. Likewise, the charging conditions of utilization are defined by a maximum specified recharging current Ibat.rech.max, a maximum specified recharging voltage Vbat.rech.max or even a specified operating temperature range.

This information allows a maximum instantaneous discharge power Pbat.max.spec(t) that can be requested of the source to be calculated, under constraint of respecting all of the specifications applicable to the source. This maximum secured power Pbat.max.spec(t) can be determined according to the equation below:

$$Pbat.\max.spec(t) = \min\left[\frac{E^2bat(t)}{4Rbat(t)}, \frac{(Ebat(t) - Vbat.rech.\max)Vbat.rech.\max}{Rbat(t)}, Ebat(t)Ibat.\max - Rbat(t)I^2bat.\max\right].$$

This information also allows a maximum instantaneous recharging power Pbat.max.rech.spec(t) that can be requested of the source to be calculated, under constraint of respecting all of the specifications applicable to the source. This maximum secured recharging power Pbat.max.rech.spec(t) can be determined according to the equation below:

$$Pbat.max.rech.spec(t) = \max\left[-\frac{(Vbat.\max - Ebat(t))Vbat.\max}{Rbat(t)},\right.$$
$$\left. Ebat(t)Ibat.rech.\max - Rbat(t)I^2bat.rech.\max\right].$$

Preferably, these powers Pbat.max.spec(t) and Pbat.max.rech.spec(t) are determined for each energy storage element 13, 14. These powers Pbat.max.spec(t) and Pbat.max.rech.spec(t) are estimated by a calculation body 19 shown in FIG. 3. The calculation body 19 also controls two converters 30, 31 which are able to define a power Pbat(t) and Psc(t) delivered by the energy storage elements 13, 14 via two control means Cbat(t) and Csc(t). The control means Cbat(t) and Csc(t) are adjusted over time t according to the power needs Pchg(t) of the load 11 and to the maximum secured power Pbat.max.spec (t) of each energy storage element 13, 14.

Figure 3:
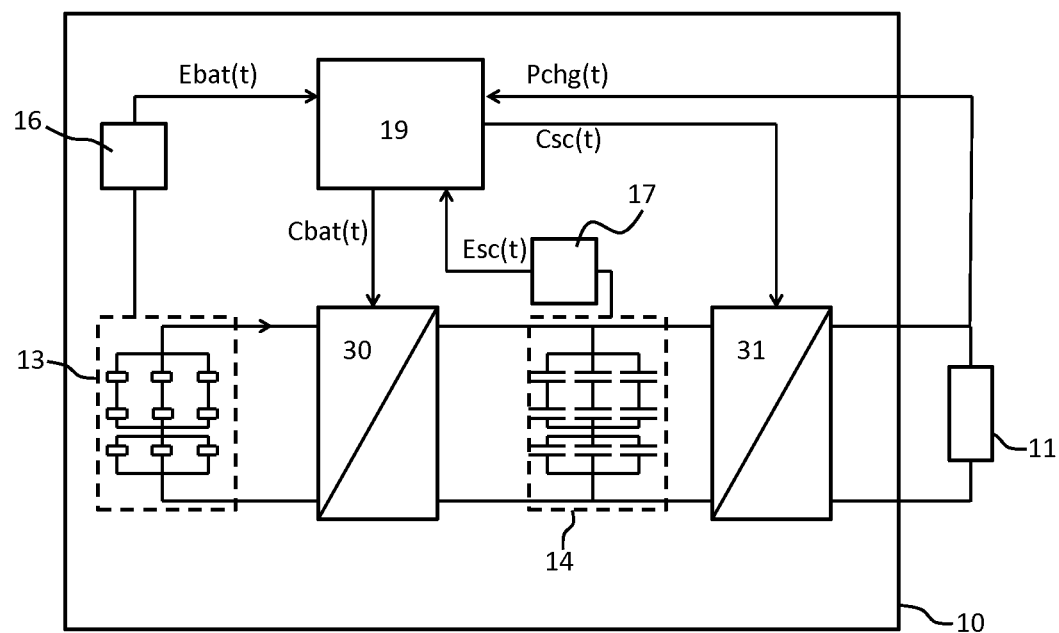
FIG. 3 illustrates a schematic representation of the controlling and monitoring means of the device of FIG. 1.

The device in FIG. 3 comprises means (16, 17) for monitoring each energy storage element (13, 14). The means (16, 17) for monitoring each storage element are able to provide information about a maximum instantaneous power that can be requested of said energy storage element (13, 14). The monitoring means (16, 17) are able to provide information about an electromotive force (Ebat(t)) and a resistance of the Thévenin equivalent model of each energy storage element reflecting the internal state and the state of health of each energy storage element (13, 14).

Figure 4:
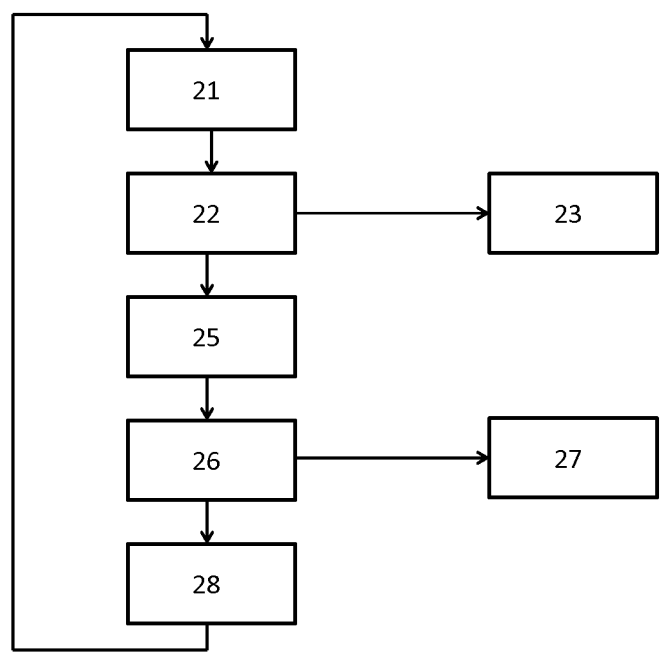
FIG. 4 is a flowchart illustrating the control and command algorithm of the device illustrated in FIG. 1.

FIG. 4 is a flowchart showing the functioning of the calculation body 19. In a first step 21, the calculation body 19 determines the maximum secured power Pbat.max.spec (t) of the first storage element 13. This maximum secured power Pbat.max.spec(t) is then compared with the power needs Pchg(t) of the load 11 in a second step 22.

When the power needs Pchg(t) of the load 11 are greater than the maximum secured power Pbat.max.spec(t), the first energy storage element 13 cannot by itself supply the power required by the load while respecting the constraints, and the calculation body 19 adjusts, during a step 23, the control means Cbat(t) and Csc(t) accordingly. The first energy storage element 13 delivers the maximum of the maximum secured power Pbat.max.spec(t) and the second energy storage element 14 delivers the remainder of the power required, namely the power needs Pchg(t) of the load 11 minus the maximum secured power Pbat.max.spec(t) of the first energy storage element 13.

When the power needs Pchg(t) of the load 11 are lower than the maximum secured power Pbat.max.spec(t), the first energy storage element 13 can by itself supply the power required by the load 11. The calculation body 19 determines, during a step 25, an available power Pbat.disp(t) corresponding to the difference between the maximum secured power Pbat.max.spec(t) and the power needs Pchg(t) of the load 11. This available power Pbat.disp(t) is then compared, during a step 26, with the maximum secured recharging power Pbat.max.rech.spec(t) of the second energy storage element 14.

When the available power Pbat.disp(t) is lower than the maximum secured recharging power Pbat.max.rech.spec(t) of the second energy storage element 14, the calculation body adjusts, during a step 28, the control means Cbat(t) and Csc(t) so that the first energy storage element 13 supplies the maximum secured power Pbat.max.spec(t) in order to fulfill the power needs Pchg(t) of the load 11 and to recharge the second energy storage element 14.

When the available power Pbat.disp(t) is greater than the maximum secured recharging power Pbat.max.rech.spec(t) of the second energy storage element 14, the calculation body adjusts, during a step 27, the control means Cbat(t) and Csc(t) so that the first energy storage element 13 supplies a power able to fulfill the power needs Pchg(t) of the load 11 and to recharge the second energy storage element 14 according to its maximum secured recharging power Pbat.max.rech.spec(t).

The invention therefore allows an efficient distribution of the available power of two energy storage elements 13, 14. As a variant, the device of the invention could comprise more than two energy storage elements. The distribution of the electric power supply over several energy storage elements allows the weight of the energy storage elements installed on board aircraft or space vehicles to be reduced or optimized. Furthermore, the invention allows ageing of the energy storage elements to be prevented by limiting their utilization to specified conditions of utilization.

The invention brings a concrete and crucial solution for the qualification in terms of life of hybrid power supplies for the aerospace sector. This is all the more important as the hybrid power supply concept finds more and more applications in the aerospace sector. Let us mention in particular:
- hybrid power supplies for supplying electric power to electromechanical servodrives on aircraft, particularly for orienting nozzles on space launchers;
- hybrid power supplies for managing calls for power on board satellites, particularly for laser remote detection systems;
- hybrid power supplies of wind turbines driving emergency electric generators on aircraft; and
- hybrid power supplies for supplying electric power to the starters of helicopter turbines.

The invention claimed is:
1. A device for the electric power supply (10) of a load (11), said device comprising:
   at least first and second energy storage elements (13, 14) connected to said load (11), said first and second energy storage elements (13, 14) comprising a maximum specified discharge current (Ibat.max) and a minimum specified voltage (Vbat.min) guaranteeing a life of said first and second energy storage elements (13, 14);
   a first converter (30) connected to the first energy storage element (13) to define a power (Pbat(t)) delivered by the first energy storage element (13);
   a second converter (31) connected to the second energy storage element (14) to define a power (Psc(t)) delivered by the second energy storage element (14);
   a calculation body (19) having a first input, a second input, a third input connected to the load (11), a first output connected to control the first converter (30), and a second output connected to control the second converter (31);
   a first monitor (16) connected to the first input of the calculation body, the first monitor providing, via the first input, information about a maximum instantaneous power (Pbat.max(t)) that can be requested of said first energy storage element (13), said first monitor (16) further providing information about an electromotive force (Ebat(t)) and a resistance (Rbat(t)) of a Thévenin equivalent model of said first energy storage element

(13) reflecting an internal state and a state of health of said first energy storage element (13); and a second monitor (17) connected to the second input of the calculation body, the second monitor providing, via the second input, information about a maximum instantaneous power (Pbat.max(t)) that can be requested of said second energy storage element (14), said second monitor (17) further providing information about an electromotive force (Ebat(t)) and a resistance (Rbat(t)) of a Thévenin equivalent model of said second energy storage element (14) reflecting an internal state and a state of health of said second energy storage element (14), wherein the calculation body:

i) determines power needs (Pchg(t)) of said load (11),
ii) determines, for each of the first and second energy storage elements(13, 14), a maximum secured power (Pbat.max.spec(t)) according to the electromotive force (Ebat(t)) and to the resistance (Rbat(t)), according to the maximum specified current (Ibat.max) and to the minimum specified voltage (Vbat.min), and
iii) controls (Cbat(t), Csc(t)) respectively the first and second converters (30, 31) for controlling each of the first and second energy storage elements (13, 14) to define the power (Pbat(t), Psc(t)) respectively delivered by said first and second energy storage elements (13, 14), and
wherein said control (Cbat(t), Csc(t)) are adjusted over time (t) according to the power needs (Pchg(t)) of said load (11) and to the maximum secured power (Pbat.max.spec(t)) of each energy storage element (13, 14).

2. The device as claimed in claim 1, wherein since said first and second energy storage elements (13, 14) comprise a maximum specified recharging current (Ibat.max.rech) and a maximum specified recharging voltage (Vbat.max.rech) guaranteeing a life of said energy storage elements (13, 14), the calculation body (19) is able to determine, for each of said first and second energy storage elements (13, 14), the maximum secured recharging power (Pbat.max.rech.spec(t)) according to the electromotive force (Ebat(t)) and to the resistance (Rbat(t)) reflecting the internal state and the state of health of each energy storage element (13, 14), according to the maximum specified recharging current (Ibat.rech.max) and to the maximum specified recharging voltage (Vbat.rech.max), said control (Cbat(t), Csc(t)) from said calculation body (19) being adjusted over time (t) according to the power needs (Pchg(t)) of said load (11), to the maximum secured power (Pbat.max.spec(t)) and to the maximum secured recharging power (Pbat.max.rech.spec(t)) of each of said first and second energy storage elements (13, 14).

3. The device as claimed in claim 1, wherein each of said first and second energy storage elements (13, 14) is a battery, a set of supercapacitors or a fuel cell.

4. The device as claimed in claim 1, wherein the electromotive force (Ebat(t)) of the Thévenin equivalent model of each of said first and second energy storage elements (13, 14) is determined by a law of behavior expressed according to the utilization of the energy storage element (13, 14).

5. The device as claimed in claim 2, wherein the first and second monitors (16, 17) are able to provide information about an internal state of each of said first and second energy storage elements (13, 14), the calculation body (19) being able to determine an electromotive force (Ebat(t)) and a resistance (Rbat(t)) of the Thévenin equivalent model of each of said first and second energy storage elements (13, 14) according to the internal state of each of said first and second energy storage elements (13, 14), said control (Cbat(t), Csc(t)) being adjusted over time (t) according to the electromotive force (Ebat(t)) and to the resistance (Rbat(t)).

6. The device as claimed in claim 5, wherein the electromotive force (Ebat(t)) and the resistance (Rbat(t)) are variable over time (t).

7. The device as claimed in claim 5, wherein said maximum secured power (Pbat.max.spec(t)) is determined by the following equation:

$$Pbat.\max.spec(t) = \min\left[\frac{E^2bat(t)}{4Rbat(t)}, \frac{(Ebat(t) - Vbat.\min)Vbat.\min}{Rbat(t)}, Ebat(t)Ibat.\max - Rbat(t)I^2bat.\max\right].$$

8. The device as claimed in claim 5, wherein said maximum secured recharging power (Pbat.max.rech.spec(t)) is determined by the following equation:

$$Pbat.\max.rech.spec(t) = \max\left[-\frac{(Vbat.\max - Ebat(t))Vbat.\max}{Rbat(t)}, Ebat(t)Ibat.rech.\max - Rbat(t)I^2bat.rech.\max\right].$$

9. A method for controlling and commanding an electric power supply device as claimed in claim 1, further comprising the following steps:
determining (21) over time (t) said maximum secured power (Pbat.max.spec(t)) of the first energy storage element (13),
comparing (22) the power needs (Pchg(t)) of the load (11) with the maximum secured power (Pbat.max.spec(t)) of the first energy storage element (13), and
adjusting (23) the control (Cbat(t), Csc(t)) in order to utilize the second energy storage element (14) when the power needs (Pchg(t)) of the load (11) are greater than the maximum secured power (Pbat.max.spec(t)) of the first energy storage element (13).

10. The method as claimed in claim 9, further comprising the following steps:
determining (25) an available power (Pbat.disp(t)) according to the time (t) when the power needs (Pchg(t)) of the load (11) are lower than the maximum secured power (Pbat.max.spec(t)) of the first energy storage element (13),
comparing (26) the available power (Pbat.disp(t)) of the first energy storage element (13) with a maximum secured recharging power (Pbat.max.rech.spec(t)) of the second energy storage element (14), and
adjusting (27) the control (Cbat(t), Csc(t)) in order to recharge the second energy storage element (14) with the first energy storage element (13) with the available power (Pbat.disp(t)) of the first energy storage element (13).

11. The device as claimed in claim 2, wherein each of said first and second energy storage elements (13, 14) is a battery, a set of supercapacitors or a fuel cell.

12. The device as claimed in claim 2, wherein the electromotive force (Ebat(t)) of the Thévenin equivalent model of each of said first and second energy storage elements (13, 14) is determined by a law of behavior expressed according to the utilization of the energy storage element (13, 14).

13. The device as claimed in claim 3, wherein the electromotive force (Ebat(t)) of the Thévenin equivalent model of each of said first and second energy storage elements (13, 14) is determined by a law of behavior expressed according to the utilization of the energy storage element (13, 14).

14. The device as claimed in claim 1, wherein the first and second monitors (16, 17) are able to provide information about an internal state of each of said first and second energy storage elements (13, 14), the calculation body (19) being able to determine an electromotive force (Ebat(t)) and a resistance (Rbat(t)) of the Thévenin equivalent model of each of said first and second energy storage elements (13, 14) according to the internal state of each of said first and second energy storage elements (13, 14), said control (Cbat(t), Csc(t)) being adjusted over time (t) according to the electromotive force (Ebat(t)) and to the resistance (Rbat(t)).

15. The device as claimed in claim 14, wherein the electromotive force (Ebat(t)) and the resistance (Rbat(t)) are variable over time (t).

* * * * *